US008999561B2

(12) United States Patent
Vissers et al.

(10) Patent No.: US 8,999,561 B2
(45) Date of Patent: Apr. 7, 2015

(54) MATERIALS FOR ELECTROCHEMICAL DEVICE SAFETY

(75) Inventors: Daniel R. Vissers, Wheaton, IL (US); Khalil Amine, Oak Brook, IL (US); Michael M. Thackeray, Naperville, IL (US); Arthur J. Kahaian, Chicago, IL (US); Christopher S. Johnson, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 935 days.

(21) Appl. No.: 13/104,134

(22) Filed: May 10, 2011

(65) Prior Publication Data

US 2011/0281154 A1    Nov. 17, 2011

Related U.S. Application Data

(60) Provisional application No. 61/334,009, filed on May 12, 2010.

(51) Int. Cl.
| | |
|---|---|
| *H01M 2/16* | (2006.01) |
| *H01M 2/02* | (2006.01) |
| *H01M 10/052* | (2010.01) |
| *H01M 4/62* | (2006.01) |
| *H01G 9/00* | (2006.01) |
| *C07C 59/105* | (2006.01) |
| *C09K 21/06* | (2006.01) |

(52) U.S. Cl.
CPC ............. *H01G 9/155* (2013.01); *H01G 9/0003* (2013.01); *H01M 2/16* (2013.01); *H01M 2/1686* (2013.01); *H01M 2200/00* (2013.01); *Y02E 60/13* (2013.01); *Y10T 428/2982* (2013.01)

(58) Field of Classification Search
IPC ............. H01M 4/364,4/366, 4/62, 4/628, 2/16, H01M 2/1686, 22/10; H01G 9/0003, 9/155, H01G 9/0425, 9/21, 2/14; Y02E 60/12, 60/13
See application file for complete search history.

(56) References Cited

U.S. PATENT DOCUMENTS

| | | | |
|---|---|---|---|
| 3,300,420 A | 1/1967 | Frey | |
| 4,184,021 A | 1/1980 | Frosch et al. | |
| 4,303,727 A | 12/1981 | Hamermesh et al. | |
| 4,483,908 A * | 11/1984 | Zimmerman | ..................... 429/8 |
| 4,695,619 A | 9/1987 | Hamermesh et al. | |
| 7,476,468 B1 * | 1/2009 | Lam et al. | ..................... 429/326 |
| 2005/0186479 A1 | 8/2005 | Totsuka et al. | |
| 2008/0241655 A1 * | 10/2008 | Ogawa et al. | ................. 429/120 |
| 2008/0282455 A1 * | 11/2008 | Jones et al. | ....................... 2/458 |

FOREIGN PATENT DOCUMENTS

WO    WO-97/45884    12/1997

OTHER PUBLICATIONS

Abraham D.P. et al., "Diagnostic Examination of Thermally Abused High-Power Lithium-ion Cells", Journal of Power Sources, 161(1), (2006), pp. 648-657.

(Continued)

*Primary Examiner* — Alix Eggerding
(74) *Attorney, Agent, or Firm* — Foley & Lardner LLP

(57) ABSTRACT

An electrochemical device includes a thermally-triggered intumescent material or a gas-triggered intumescent material. Such devices prevent or minimize short circuits in a device that could lead to thermal run-away. Such devices may include batteries or supercapacitors.

31 Claims, 10 Drawing Sheets

(A)

(B)

(56) References Cited

OTHER PUBLICATIONS

Kang, Y. et al., "Lithium Ion-selective Electrodes Employing Tetrahydrofuran-based 16-Crown-4 Derivatives as Neutral Carriers", Analyst, vol. 122, Nov. 1997, pp. 1445-1450.

Labuschagné, F.J.W.J. et al., "Metal Catalysed Intumescence: Characterisation of the Thermal Decomposition of Calcium Gluconate Monohydrate", Journal of Materials Science, 38,(2003), pp. 1249-1254.

* cited by examiner (A)                      (B)

Before Heating        After Heating (A)        (B)

MATERIALS FOR ELECTROCHEMICAL DEVICE SAFETY

CROSS-REFERENCE TO RELATED APPLICATIONS

This application claims the benefit of U.S. Provisional Patent Application No. 61/334,009, filed on May 12, 2010, the entire disclosure of which is incorporated herein by reference for any and all purposes.

STATEMENT OF GOVERNMENT RIGHTS

The United States Government has rights in this invention pursuant to Contract No. DE-AC02-06CH11357 between the United States Government and UChicago Argonne, LLC, representing Argonne National Laboratory.

FIELD

The technology is generally related to electrochemical devices. More specifically, the technology is related to materials to improve the safety of non-aqueous lithium batteries, lithium-ion batteries and supercapacitors.

BACKGROUND

Secondary batteries are used as portable power sources for a variety of personal electronic applications, such as mobile phones, laptop computers, cordless power tools, digital cameras, digital camcorders, hybrid electric vehicles (HEV), plug-in hybrid electric vehicles (PHEV) and electric vehicles (EV). To support these applications, secondary batteries based upon lithium have emerged as the predominate solution. Unfortunately, a number of the chemistries used in these secondary batteries are prone to thermal run-away, up to and including, battery fires. For instance, a 1-in-200,000 failure rate triggered a recall of almost six million lithium-ion packs used in laptops. As the energy storage requirements for hybrid electric vehicle (HEV), plug-in hybrid electric vehicle (PHEV), or electric vehicle (EV) applications is orders of magnitude higher than for a laptop, the need for a solution to the thermal run-away and potential fire dangers dramatically increase.

The root cause of the thermal run-away is believed to be an internal short circuit across the battery separator. Once an internal short circuit across the battery separator forms, an electrical current begins to flow through this short circuit and begins to heat the chemical components of the battery. As the temperature inside the battery rises, the higher temperatures trigger chemical reactions that lead to additional heat generation and to still higher temperatures. If unchecked, this process may continue until the materials of the battery are combusting, and pose a dangerous situation to the users of these batteries.

To address the thermal run-away issues of secondary batteries, several solutions have been posited that call for a change in the electrochemical reactions of the secondary battery. Unfortunately, such changes typically sacrifice the total energy storage capability of the secondary battery. For instance, replacement of the graphite negative electrode in a lithium ion battery with a lithium titanate electrode, while effective in improving the safety, results in a significant decrease in the theoretical gravimetric capacity from 372 mAh/g to 175 mAh/g. In other solutions, flame retardants have been introduced to battery electrolytes, however, while flame retardants help to restrain fire, they do not prevent the fire. Hence, such solutions have limited effect in preventing fire. In another solution, battery cell separators have been coated with ceramics to strengthen the separator against breaches which can lead to internal short circuiting. Such an approach may limit the number of internal short circuits, but it does little to inhibit internal short circuits caused by impurities in the electrolyte that form dendrites from one electrode through the separator and to the other electrode. Thus, the need for an approach to solve the safety issues in lithium- and lithium-ion batteries persists.

SUMMARY

In one aspect, an electrochemical device includes a thermally-triggered intumescent material or a gas-triggered intumescent material. In some embodiments, the device further includes a positive electrode, a negative electrode, and a separator. In some embodiments, the device is encased by a casing. In some embodiments, the intumescent material is present in an amount sufficient to disrupt a short circuit in the electrochemical device. In some such embodiments, the amount is from 0.001 wt % to 40 wt %, where the wt % is based upon the total weight of the positive electrode, negative electrode, separator, and electrolyte. In some embodiments, the device is a battery or supercapacitor. In other embodiments, the device is a lithium battery or a lithium-ion battery. In some embodiments, the intumescent material is a separator for an electrochemical device.

In some embodiments, the separator includes the intumescent material. In some embodiments, the separator is the intumescent material. In some embodiments, the positive electrode includes the intumescent material. In some embodiments, the negative electrode includes the intumescent material. In other embodiments, the intumescent material is incorporated in the positive electrode, the negative electrode, or the separator, as an incorporated intumescent material. In other embodiments, the intumescent material is coated on the surface of the positive electrode, negative electrode, or separator as an intumescent material coating.

In some embodiments, the intumescent material is calcium gluconate monohydrate; a material having a glass transition temperature below 250° C. and a blowing agent with activation temperature between 50° C. and 250° C.; a shape memory polymer; or an Expancel® microsphere. In other embodiments, the intumescent material coating includes a lithium ionophore.

In some embodiments, the intumescent material coating includes a porous material. In some such embodiments, the porous material is a zeolite; a high porosity alumina aerogel; a high porosity silica aerogel; a high porosity silica xerogel; or a high porosity sandstone.

BRIEF DESCRIPTION OF THE DRAWINGS

FIG. 3B is a magnification of a portion of FIG. 3A.

DETAILED DESCRIPTION

Figure 1:
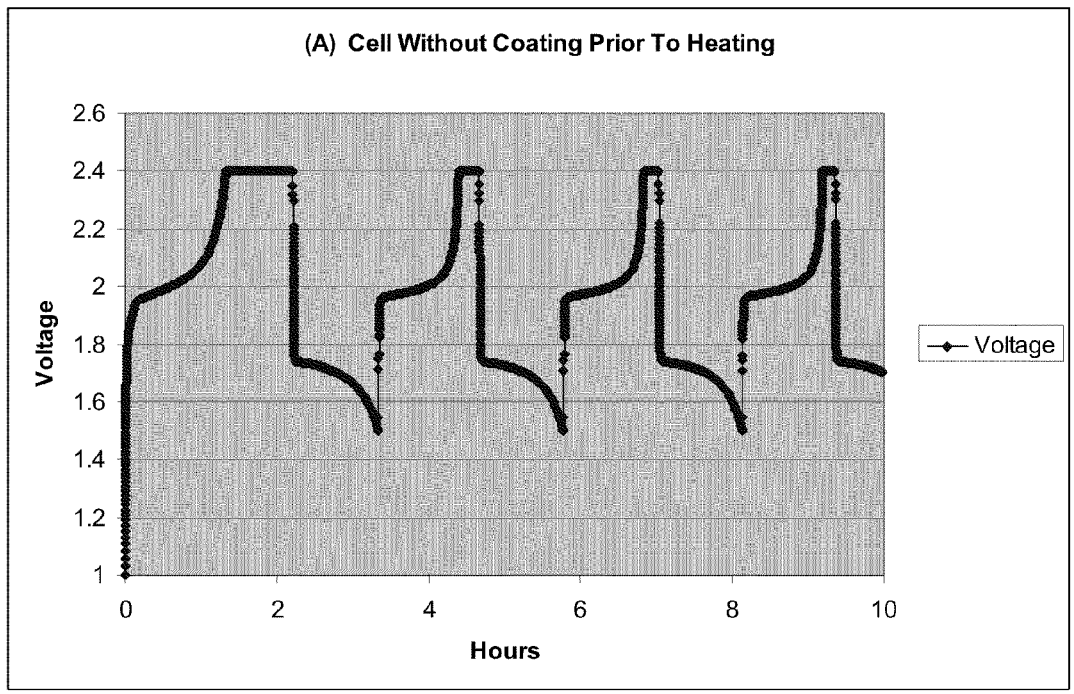
FIGS. 1A and 1B are cycling profiles for a coin cell without (A) and with (B) a coating of calcium gluconate monohydrate on the surface of the positive electrode prior to heating, according to various embodiments.
Figure 1:
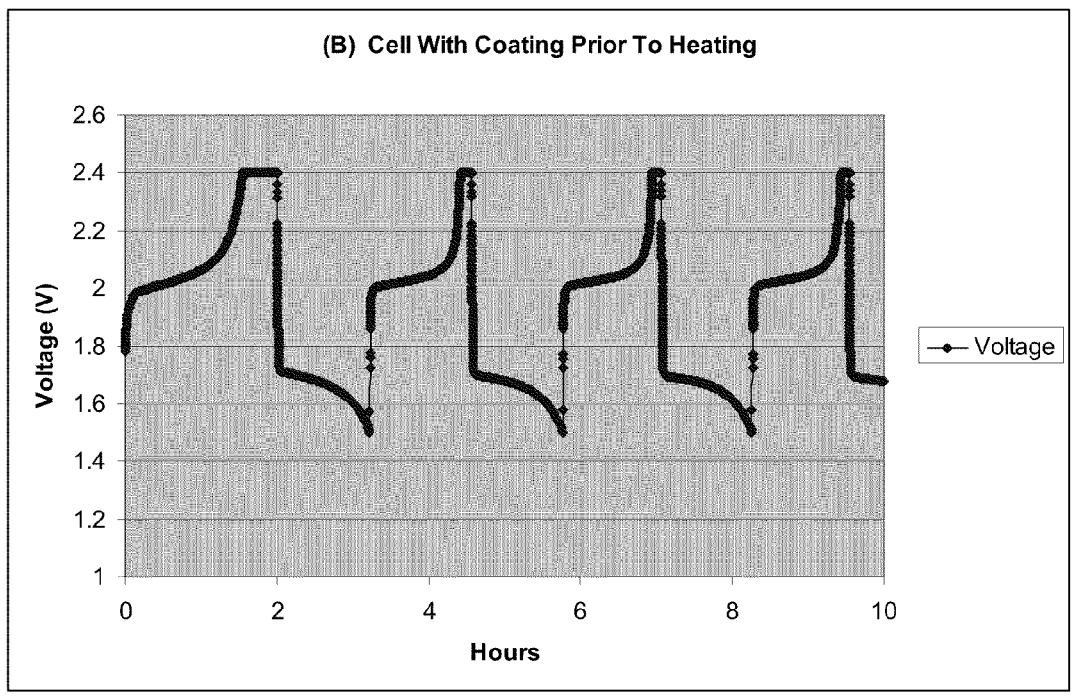

In one aspect, an electrochemical device is provided that includes a thermally- or gas-triggered intumescent material. Such electrochemical devices can include, but are not limited to, non-aqueous lithium batteries, lithium-ion batteries, and supercapacitors, where lithium batteries refer to systems using lithium metal anodes such as lithium-polymer electrolyte batteries, lithium sulfur batteries, lithium-air- or lithium-oxygen batteries. Lithium-ion batteries refer to systems in which lithium is shuttled between anode and cathode materials that can react with, and release lithium during charge and discharge including, but not limited to, metal, semi-metal, intermetallic, metal oxide anodes and lithium metal oxide, lithium metal phosphate, sulfur and oxygen cathodes. As used herein, an intumescent material is one which swells in response to a stimulus, thereby increasing in volume and decreasing in density. As used herein, intumescence is the act or process of swelling, or the condition of being swollen. Therefore, a thermally-triggered intumescent material is one that swells as a result of heating. Likewise, a gas-triggered intumescent material is one that swells as a result of the presence of gas.

One characteristic of a thermally-triggered intumescent material is its onset temperature. As used herein, the term onset temperature is the temperature at which the intumescent material begins to expand. In one embodiment, the intumescent material is one that expands from a normal state to an expanded state in response to heating or gas. For example, an intumescent material such as calcium gluconate monohydrate expands in volume in response to heating. In another embodiment, an intumescent material is in a compressed state which expands to a normal state upon heating. For example, an intumescent material such as a shape memory polymer may be compressed to a deformed state, which upon heating to the transition temperature causes the shape memory polymer to return to its original, uncompressed state. In such an example, the transition temperature of a shape memory polymer is analogous to the onset temperature of an intumescent material.

To be an intumescent material, as that term is used herein, the material must be present in an effective amount that is sufficient to cause swelling inside the electrochemical device to prevent or minimize a run-away thermal event. Thus, the amount of the material present in the device must be sufficient for it to act as an effective intumescent material to impede electron flow and prevent or abate a run-away thermal event. The presence of such a material in an electrochemical device is not enough, if it cannot act as an intumescent material. In some such embodiments, the amount is from 0.001 wt % to 40 wt %, where the wt % is based upon the total weight of the positive electrode, negative electrode, separator, and electrolyte. In some embodiments, the amount is from 0.01 wt % to 20 wt %. In some embodiments, the amount is from 0.01 wt % to 7 wt %. In some other embodiments, the amount is from 5 wt % to 15 wt %. In some other embodiments, the amount is from 0.1 wt % to 15 wt %. In some other embodiments, the amount is from 1 wt % to 15 wt %.

In some embodiments, the intumescent material is used as a separator in an electrochemical device. In some embodiments, the intumescent material is coated on a surface of one or more of a positive electrode, a negative electrode, or a separator of the electrochemical device. In other embodiments, the intumescent material is incorporated in a positive electrode, a negative electrode, or a separator of the electrochemical device. In yet other embodiments, the intumescent material may be incorporated and/or coated on a positive electrode, a negative electrode, or a separator of the electrochemical device. The location of the intumescent material in the electrochemical device determines how the device will respond to a run-away thermal event.

In embodiments where the intumescent material is used as a separator between, or is coated (i.e., an intumescent coating material) on, the surface of the positive electrode, the negative electrode, or the separator of the electrochemical device, the intumescent material responds to a thermal run-away event, or to a gas generated by the thermal run-away event, by one or more of several responses. First, the intumescent material may expand into the separator to fill the pores through which lithium ions are transported between the positive and negative electrodes. Alternatively, where the intumescent material is a fiber forming the separator, the individual fibers expand. Such action prevents the migration of the lithium ions, thereby effectively blocking the source of the thermal run-away event. Second, the expansion of the intumescent material may push the electrodes apart in the region of the short circuit. In other words, as the thermal run-away event progresses, or gas generated by the thermal event expands, the intumescent material is triggered to swell and act on the electrodes to force them apart and eliminate the short circuit, i.e. the underlying cause of the run-away thermal event or gas generation. Thus, in either response described above, the intumescent materials act to block or remove the genesis of the adverse thermal event(s). Furthermore, if the separator begins to melt due to the run-away thermal event, the volumetric expansion of the intumescent material will prevent the electrodes from touching and thereby preventing a larger internal short circuit. In some embodiments, where the internal short circuit is broken, or prevented, the cell will continue to operate. Therefore, in some embodiments, the intumescent material does not destroy the operation of the cell.

In some other embodiments, the electrochemical device is configured to rupture when the intumescent material is activated. Depending upon the expansion potential of the intumescent material, and concomitant build-up of pressure inside the electrochemical device, the device or the casing of the device may be configured to rupture at an intentionally placed weak spot in the device or through a seal of the device. In such embodiments, the intumescent material, or materials, are incorporated in any of the positive electrode, the negative electrode, or the separator. In such embodiments, the intumescent material is an incorporated intumescent material.

In yet other embodiments, the embodiments described in the immediately preceding two paragraphs may be combined in an electrochemical device. In such embodiments, the intumescent material used as a separator between the electrodes or as a coating on the electrodes has a lower activation temperature than the incorporated intumescent material. In doing so, the combined effect on the battery during a thermal run-away would be a staged process. First, the battery would push the electrodes a part near the internal short circuit. However, should this not cease the thermal run-away event, then second, the incorporated intumescent material would expand and rupture the electrochemical device, thereby terminating the thermal run-away event. In some embodiments, the activation of the intumescent material that is the separator or a coating on an electrode or the separator is sufficient to rupture the electrochemical device.

In other embodiments, the intumescent material may be isolated from the electrochemical device components, i.e. the positive and negative electrodes, the separator, and the casing by encapsulation in a shell, i.e. an encapsulating shell. The encapsulating shell may include carbon, polymers (insulating or conducting), metals, metal alloys, or ceramics. Suitable ceramics include non-oxide ceramics such as tantalum carbide, tantalum nitride, tantalum diboride, tungsten carbide, tungsten diboride, hafnium carbide, hafnium nitride, hafnium diboride, zirconium carbide, zirconium nitride, zirconium diboride, silicon carbide, silicon nitride, niobium carbide, niobium nitride, niobium diboride, titanium carbide, titanium nitride, titanium diboride, vanadium carbide, vanadium nitride, boron carbide, and boron nitride; and oxide ceramics such as alumina, hafnia, silica, tantala, titania, yttria, and zirconia. Suitable metals include, rhenium, tantalum, tungsten, niobium, molybdenum, iridium, platinum, boron, and silicon. Suitable metal alloys include tungsten-rhenium, tantalum-tungsten, molybdenum-rhenium, and iridium-platinum. The encapsulating shell may electrochemically isolate the intumescent material from the rest of the battery. The shell can also be electrically conductive so that it does not increase the resistivity of the electrodes when imbedded within them. As the encapsulating shell encapsulates an intumescent material, the only requirement is that it must expand or rupture as the intumescent material expands in the presence of a gas or in response to heat.

Suitable intumescent materials may include, but are not limited to: calcium gluconate and/or magnesium gluconate and hydrated derivatives thereof; a shape-memory polymer; an intumescent material within an encapsulating shell such as carbon, a conductive polymer, an insulating polymer, or metals; expandable graphite; a silicate such as sodium silicate, lithium silicate, or potassium silicate; or an intumescent polymer such as those described in U.S. Pat. No. 4,695,619.

In one embodiment, the intumescent material is calcium gluconate monohydrate. Calcium gluconate monohydrate has an onset temperature near 147° C., and as such, it is suitable to stop a thermal run-away within a lithium battery or lithium ion battery. The calcium gluconate monohydrate can be coated onto one or more of the various surfaces of the cell or can be imbedded into one of more the battery components as detailed above. To coat the calcium gluconate monohydrate powder onto the surface of a positive or negative electrode that includes a polyvinyldifluoride (PVDF), the calcium gluconate monohydrate may be suspended in a solvent. For example, the solvent may be water or an alcohol such as methanol, ethanol, propanol, iso-propanol, butanol, iso-butanol, tert-butanol, or other lower alcohols. When the alcohol suspension is applied to the electrode surface, it minimally activates the PVDF binder on the surface of the electrode to affix the calcium gluconate monohydrate to the electrode. To imbed the calcium gluconate monohydrate in one or more of the battery components, the calcium gluconate monohydrate can be added during the fabrication process of the electrode. For instance, when fabricating the electrode slurry, the calcium gluconate monohydrate can be mixed into the slurry and cast into an electrode.

In one embodiment, the intumescent material is a polymeric material with a glass transition temperature below 250° C. For example, a fluorogel may be mixed with a blowing agent such that at an activation temperature between 50° C. and 250° C., the blowing agent is activated and blows a foam of the fluorogel. As used herein, a blowing agent refers to a material that will form a gas either by vaporization or by decomposition, and which is trapped by the fluorogel, or other polymer, such that as the gas is formed it blows the fluorogel or other polymer in a foam. In some embodiments, the fluorogel or blowing agent is a liquid. In such embodiments, the materials are mixed together to form a solution or suspension that is then applied to the various surfaces of the battery or imbedded into the various components of the battery as described above. In some embodiments, where both the fluorogel and blowing agent are solids, an appropriate solvent is required to form the solution or suspension. Alternatively, once the liquid is made, the liquid can be dried to form a solid material which can be broken into particles. The fluorogel and blowing agent, a binder such as PVDF, and a solvent can be used to form a granular slurry. The slurry can then be applied to the various surfaces of the electrochemical device, or imbedded into the various components of the electrochemical device. In other embodiments, the intumescent material may be incorporated into the fabrication process of the negative electrode, positive electrode, or separator of the electrochemical device. Suitable blowing agents may include, but are not limited to, sodium bicarbonate, unmodified azodicarbonamide, preactivated azodicarbonamide, p,p'-oxybis(benzene sulfonylhydrazide), dinitrosopentamethylene tetramine, Foamazol® 30, Foamazol® 32, Foamazol® 40, Foamazol® 41, and Foamazol® 43. Suitable fluorogels include, but are not limited to, Dow Corning Fluorogel 4-8022, Dow Corning Fluorogel 3-6679. Suitable other polymers include, but are not limited to, polyethylene, poly-trans-chlorobutadiene, and poly-cis-chlorobutadiene. Suitable solvents include, but are not limited to, Dow Corning OS-20, halogenated hydrocarbons, and higher aliphatic esters and ketones In some embodiments, a slurry of the intumescent material is used to coat a surface through which lithium ions or other cations may permeate. The surface may be either the separator itself, or it may be a coating on the surface of the electrodes that act as a separator. In such embodiments, during the drying process, some porosity is formed in the coating due to the evaporation of solvent. This porosity will eventually be filled with electrolyte that enables lithium cation conductivity. However, if insufficient porosity is produced by this method, or if another method is used to deposit the intumescent material, then inclusion of porous additives in the slurry is necessary to allow for lithium ion transport through the intumescent material coating. Such porous additives include, but are not limited to lithium ionophores or porous materials. Several suitable lithium ionophores are describes in the literature as tetrahydrofuran-based-16-crown-4 derivatives. For example, see Kang et al. *Analyst* (1997) 122, 1445-1450. Other suitable lithium ionophores include, but are not limited to, lithium ionophore I (N,N'-diheptyl-N,N',5,5-tetramethyl-3,7 dioxanonanediamide), lithium ionophore II (N,N,N',N'-tetraisobutyl-cis-cyclohexane 1,2-dicarboxamide), lithium ionophore III (N,N-dicyclohexyl-N',N'-diisobutyl-cis cyclohexane-1,2-dicarboxamide), lithium ionophore IV (N,N,N',N'-tetracyclohexyl(2-butyl-2-ethyltrimethylenedioxy)diacetamide, 5-butyl-5-ethyl-N,N,N',N'-tetracyclohexyl-3,7-dioxaazelaic diamide), lithium ionophore VI (6,6-dibenzyl-1,4,8-11-tetraoxacyclotetradecane, 6,6-dibenzyl-14-crown-4), lithium ionophore VII (6-[2-(diethylphosphonooxy)ethyl]-6-dodecyl-14-crown-4,6-dodecyl-(14-crown-4)-6-ethanol diethyl phosphate), and lithium ionophore VIII (N,N,N',N',N'',N''-hexacyclohexyl-4, 4',4''-propylidynetris(3-oxabutyramide)). Suitable porous materials include, but are not limited to, zeolite materials such as ferrierite, Linde Type A zeolite, Linde Type L zeolite, analcime, chabazite, clinoptilolite, heulandite, natrolite, phillipsite, and stilbite; high porosity alumina; silica aerogels; silica xerogels; high porosity sandstone; and the like.

The adding of an ionophore or porous materials to the coating can be expanded to other polymer systems to form separators from polymers that would otherwise inhibit the passage of lithium ions or other cations. For example, the lithium ionophore can be added to an engineered plastic such as polyether ether ketone (PEEK), thermoplastic polyimide (TPI), polybenzimidazole (PBI), high-temperature sulfones, and polyamide-imide (PAI); fluoropolymers; polysulfone; polyethersulfone; liquid-crystal polymers (LCP); polyetherimide (PEI); nylons; polyphenylene sulfide (PPS); polyethylene terephthalate (PET); polyvinylidene fluoride (PVDF); polypropylene (PP); polyethylene (PE); thermoplastics; elastomers; and gels.

This intumescent material can be applied by various methods and in varying thickness. For instance, a viscous liquid polymer suspension of an intumescent material can be applied to a surface using a pipette, brush, roller, spray equipment, dipping, or even as a pass-through flowing liquid. The viscous liquid polymer suspension of the intumescent material may be coated as a slurry on the separator or electrode. The desired thickness can be achieved by alternating the application process, using a spin coating technique, using a blade technique, or using varying amounts of suitable solvent.

In another embodiment, the intumescent material is a shape memory polymer. As used herein, the term shape memory polymer refers to a material that when formed has an original shape. The shape memory polymer may be heated above a transition temperature and compressed to form a temporary (i.e., deformed) shape and then cooled below the transition temperature. When the shape memory polymer in its temporary shape reaches the transition temperature, it returns to its original shape, thereby acting in an intumescent fashion (i.e., expanding upon heating). In other words, the shape memory polymer is an intumescent material.

In such embodiments, the original state and the deformed state of the shape memory polymer should be designed based upon the desired functionality. In some embodiments, the shape memory polymer is a plurality of deformed fibers woven together as a porous weave. The porous weave allows for the flow of lithium ions through the cell. However, when a thermal event occurs which causes the temperature of the system to increase beyond the transition temperature, the fibers expand closing the pores of the porous weave, thus impeding the flow of lithium cations, shutting off the source of the thermal run-away, and forming a resistive barrier between the electrodes. In such embodiments, the fiber is made of a closed cell foam polymer. Such polymers may facilitate compression of the fiber. Thus, the deformed state of the shape memory polymer could be the fiber with a smaller radius. Such fibers may be woven into a loose fabric-like material such that the flow of lithium cations is not inhibited while the fibers are in their deformed state, yet such that the flow of lithium cations is inhibited while the fibers are in their original state. In doing so, the fabric functions as a separator until the activation temperature is reach at which point the fibers of the fabric expand to their original state and push the electrodes apart and inhibit or impede the flow of lithium cations. Other geometric shapes of the shape memory polymers may also be used.

Alternatively, the original state of the shape memory polymer may be as small spheres. Small spheres could be fabricated using a shape memory polymer foam so that they may readily be compressed. Where the small spheres are compressed in the electrochemical device, when the activation temperature is reached, they grow in size to cause cell rupture, thereby terminating the runaway thermal event. Such shape memory polymer spheres could be incorporated into the positive electrode, the negative electrode, or the separator of an electrochemical device.

In some embodiments, Expancel's Expancel® microspheres may be used in an electrochemical device. In such microspheres, a thermoplastic shell encapsulates a hydrocarbon. In the presence of heat, the hydrocarbon evaporates and expands the shell. As a result, such microspheres may act as a suitable intumescent material.

Suitable shape memory polymers include, but are not limited to, block co-polymers of polyethyleneterephhalate (PET) and polyethyleneoxide (PEO); block co-polymers of polystyrene and poly(1,4-butadiene); tri-block co-polymers ABA, poly(2-methyl-2-oxazoline) and poly(tetrahydrofuran); amorphous polynorbornene such as Norsorex (available from CdF Chemie/Nippon Zeon); organic-inorganic hybrid polymers of polynorbornene units which are partially substituted by polyhedral oligosilsesquioxane (POSS); PEO-PET block co-polymers cross-linked with maleic anhydride or glycerol/ dimethyl 5-sulfoisopthalate; PEO-AA/MMA block co-polymers cross-linked using N,N'-methylene-bis-acrylamide; PEO-MMA/N-vinyl-2 pyrrolidone block co-polymers cross-linked with ethyleneglycol dimethacrylate; and PEO-PMMA block co-polymers cross-linked using ethyleneglycol dimethacrylate.

In a further embodiment, the intumescent material may be a heat-suppressing agent as well. A number of compounds absorb heat yet do not swell and thus are known as heat-suppressing agents. For example, compounds of an organic acid, or a salt of an organic acid may be used as heat-suppressing agents. Suitable organic acids include, but are not limited to, ascorbic acid, adipic acid, and gluconic acid. Suitable salts of organic acids include those of the alkaline earth elements and ammonium or tertiary alkylammonium ions. In one embodiment, the salt of an organic acid is a calcium or magnesium salt. As will be noted, at low temperature many of the heat-suppressing agents act as such, however at higher temperatures some compounds also are intumescent. Thus, some compounds such as calcium gluconate hydrate, magnesium gluconate hydrate, and some Fomazols, such as Fomazol® 30, can act in a dual capacity as that of a heat-suppressant and as an intumescent material at sufficiently high temperature. Other materials such as ascorbic acid or adipic acid only act in a heat suppressant capacity. While other materials such as Fomazol® 86 act as intumescent materials, but not as heat suppressants.

In some embodiments, where the salt of an organic acid is employed as a heat suppressant or intumescent material, the calcium and magnesium may be preferred as they can remove, by precipitation, unwanted species, such as fluoride ions that may be generated within the cell. Such fluoride ions may generate hydrofluoric acid by hydrolysis of the electrolyte salts such as $LiPF_6$, $LiBF_4$ or $LiAsF_6$. In some embodiments, the salt of the organic acid is the calcium or magnesium salt of ascorbic acid or gluconic acid. In some embodiments, the heat-suppressant material is of a solid form, and is insoluble in the liquid, polymer or gel-polymer electrolyte. The heat-suppressant materials may be antioxidant or flame retardant materials. As used herein, antioxidants are those substances that oppose or inhibit damaging oxidation reactions to combat excessive temperature increase and, in particular, uncontrolled thermal runaway reactions and fire. The heat-suppressant materials are typically blended with the components of lithium cells, for example, as additives to the positive and/or negative electrode, to the electrolyte, and/or to the electrolyte separator.

In some embodiments, the electrochemical devices may also include anti-oxidants and flame retardant materials. Anti-oxidants can aid in preventing run-away thermal events by inhibiting rapid oxidation which can lead to a fire danger. Similarly, flame retardants can inhibit fire formation. Suitable antioxidants include, but are not limited to, tetrakismethylene (3,5-di-t-butyl-4-hydroxyphenyl) propionate (Irganox 1010 or equivalent); octadecyl-3-(3',5'-di-t-butyl-4-hydroxyhydrocinnamate) methane (Irganox 1076 or equivalent); a blend of tetrakismethylene (3,5-di-t-butyl-4-hydroxyphenyl) propionate/tris(2, 4-di-t-butyl-phenyl) phosphite/di-stearyl-3,3'-thio dipropionate (Lowinox TB311); Anox™TB-321 Phenolic/Phosphite Antioxidant with synergist; Irganox1M1010 Phenolic Antioxidant; Irganox™2076 Phenolic Antioxidant; Lowox™ TB311 Antioxidant Blend Hostanox M03 Antioxidant; and Hostanox™PAR 24 Antioxidant. Suitable flame retardants include, but are not limited to, aluminum hydroxide, magnesium hydroxide, hydromagnesite, antimony trioxide, various hydrates, red phosphorus, boron compounds, tetrakis(hydroxymethyl)phosphonium salts, polychlorinated biphenyls (PCBs), chlorendic acid derivates such as dibutyl chlorendate and dimethyl chlorendate, chlorinated paraffins; organobromines such as polybrominated diphenyl ether (PBDEs), pentabromodiphenyl ether (pentaBDE), octabromodiphenyl ether (octaBDE), decabromodiphenyl ether (decaBDE) and hexabromocyclododecane (HBCD); and organophosphates in the form of halogenated phosphorus compounds such as tri-o-cresyl phosphate, tris(2,3-dibromopropyl) phosphate (TRIS), bis(2,3-dibromopropyl) phosphate, tris(1-aziridinyl)-phosphine oxide (TEPA). Mixtures of any two or more antioxidants, two or more flame retardants, or one or more antioxidants and one or more flame retardants may also be used.

The positive electrode of an electrochemical device may be any positive electrode as is known in the art. For example, the positive electrode may any of those as are known as positive electrodes for lithium- and lithium-ion batteries, such as metal-oxides, lithium-metal oxides, metal phosphates, lithium-metal-phosphates, metal sulfides, oxygen, fluorine, and sulfur. Suitable, positive electrode materials include, but are not limited to, $Li_2O_2$, $Li_2O$, $LiF$, $Li_2S$, spinel, olivine, carbon-coated olivine, $LiFePO_4$, $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiMn_2O_4$, $LiFeO_2$, $LiMet_{0.5}Mn_{1.5}O_4$, $Li_{1+x}Mn_{2-z}Met_yO_{4-m}X_n$, $LiFe_{1-z}Met''_yPO_{4-m}X_n$, $Li_{1+x}Mn_{2-x}O_4$, $Li_{1+x'}Ni_\alpha Mn_\beta Co_\gamma Met'_\delta O_{2-z}Y_{z'}$, $A_nB_2(XO_4)_3$, or $Li_{1+x}Mn_{2-x}O_4$; wherein Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, or Zn; B is Ti, V, Cr, Fe, or Zr; X is P, S, Si, W, or Mo; Y is F or S; and further wherein $0 \le x \le 0.3$, $0 \le y \le 0.5$, $0 \le z \le 0.5$, $0 \le m \le 0.5$, and $0 \le n \le 0.5$; $0 \le x' \le 0.4$, $0 \le \alpha \le 1$, $0 \le \beta \le 1$, $0 \le \gamma \le 1$, $0 \le \delta \le 0.4$, and $0 \le z' \le 0.4$; and $0 \le n' \le 3$. In some other embodiments, the positive electrode material comprises S, $NiCl_2$, FeS, $FeS_2$, $CaCrO_4$, $V_2O_5$, tungsten(III) oxide, tungsten(IV) oxide, or tungsten(VI) oxide. In yet other embodiments, the positive electrode material comprises an electrically conductive metal or polymer. In various embodiments, the positive electrode material may be coated with a metal oxide. For example, the positive electrode material is a spinel or olivine, the material may be coated with $ZrO_2$, $TiO_2$, $ZnO_2$, $WO_3$, $Al_2O_3$, $MgO$, $SiO_2$, $SnO_2$ $AlPO_4$, or $Al(OH)_3$.

The negative electrode of an electrochemical device may be any negative electrode as is known in the art. For example, the negative electrode may any of those as are known as negative electrodes for lithium ion batteries. Suitable, negative electrode materials are comprised of, but not limited to, Li, Na, graphite, hard carbons, meso-carbon microbeads (MCMB), lithium titanate spinel ($Li_4Ti_5O_{12}$), semimetals such as Si and Ge, metals and intermetallic compounds such as Sn and $Cu_6Sn_5$, respectively, and lithiated derivatives thereof. In other embodiments, the negative electrode is comprised of an electrically conductive polymer.

The separator of an electrochemical device may be any separator as is known in the art. For example, the separator may any of those as are known as separators for lithium ion batteries. Suitable, separators materials include ceramics, glass, polyether ether ketone (PEEK), thermoplastic polyimide (TPI), polybenzimidazole (PBI), high-temperature sulfones, and polyamide-imide (PAI), fluoropolymers, polysulfone, polyethersulfone, liquid-crystal polymers (LCP), polyetherimide (PEI), nylons, polyphenylene sulfide (PPS), polyethylene terephthalate (PET), polyvinylidene fluoride (PVDF), polypropylene (PP), polyethylene (PE), thermoplastics, elastomers, gels, or the like.

The electrochemical devices may also include an electrolyte solvent. The electrolyte solvent of an electrochemical device may be any electrolyte solvent as is known in the art. For example, the electrolyte solvent may any of those as are known as electrolyte solvents for lithium ion batteries. Suitable, electrolyte solvents include acetonitrile, butylene carbonate, γ-butyrolactone, diethyl carbonate, 1,2-dimethoxyethane, dimethyl carbonate, 1,3-dioxolane, ethylacetate, ethylbutyrate, ethylene carbonate, ethylformate, ethyl methyl carbonate, ethylpropionate, methylbutyrate, methylformate, methylpropionate, methyl propyl carbonate, 1-methyl-2-pyrrolidone, propylene carbonate, or tetrahydrofuran.

The electrochemical devices may also include an alkali metal salt in the electrolyte. The alkali metal salt may be a lithium salt, as are known in the art. In some embodiments, the alkali metal salt is $Li[B(C_2O_4)_2]$, $Li[BF_2(C_2O_4)]$, $Li[PF_2(C_2O_4)_2]$, $LiClO_4$, $LiBF_4$, $LiAsF_6$, $LiPF_6$, $LiCF_3SO_3$, $Li[N(CF_3SO_2)_2]$, $Li[C(CF_3SO_2)_3]$, $Li[N(SO_2C_2F_5)_2]$, lithium alkyl fluorophosphates, $Li_2B_{10}X_{10}$, or $Li_2B_{12}X_{12}$; wherein each X is independently selected from the group consisting of H, F, Cl, Br, I, $OCH_3$, and OH.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology, thus generally described, will be understood more readily by reference to the following examples, which are provided by way of illustration and are not intended to be limiting.

EXAMPLES

Example 1

Calcium gluconate monohydrate was mixed with ethanol to form a milk-white suspension. This suspension was then applied to a standard CR2032 iron (III) phosphate, LiFePO$_4$, positive electrode using a small pipette. A few drops were placed onto the electrode and air dried for about an hour. Additional drops were added to form a homogenous coating of the calcium gluconate monohydrate on the electrode surface. These coated electrodes were then heated in a vacuum oven overnight to remove any remaining water from the electrode. Afterwards, two types of CR2032 coin cells were fabricated.

Figure 2:
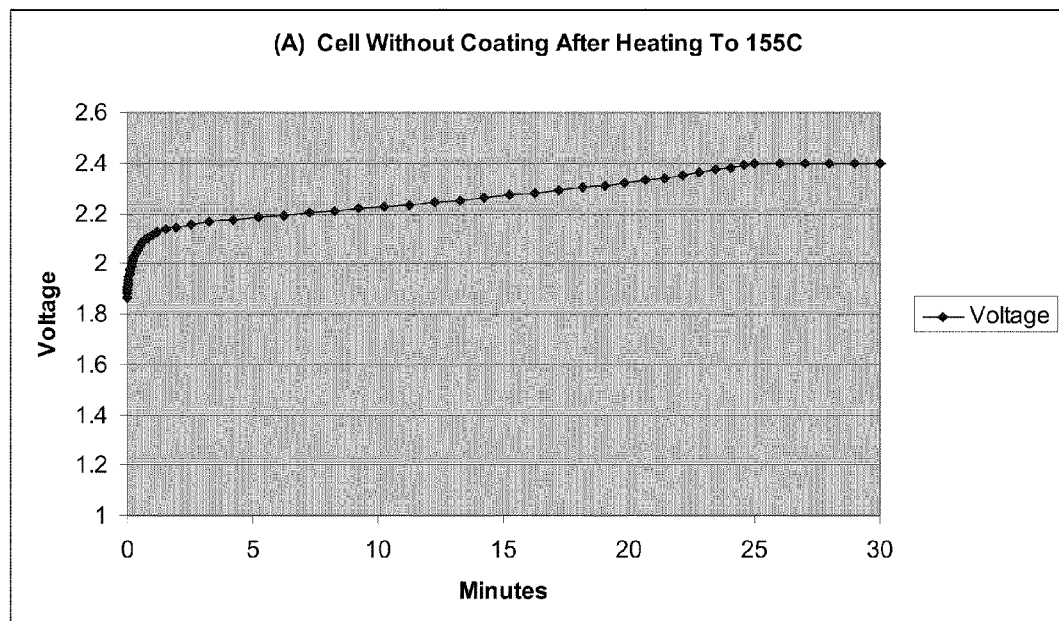
FIGS. 2A and 2B are cycling profiles for a coin cell without (A) and with (B) a coating of calcium gluconate monohydrate on the surface of the positive electrodes after heating to a temperature beyond the activation temperature of the intumescent material, according to various embodiments.
Figure 2:
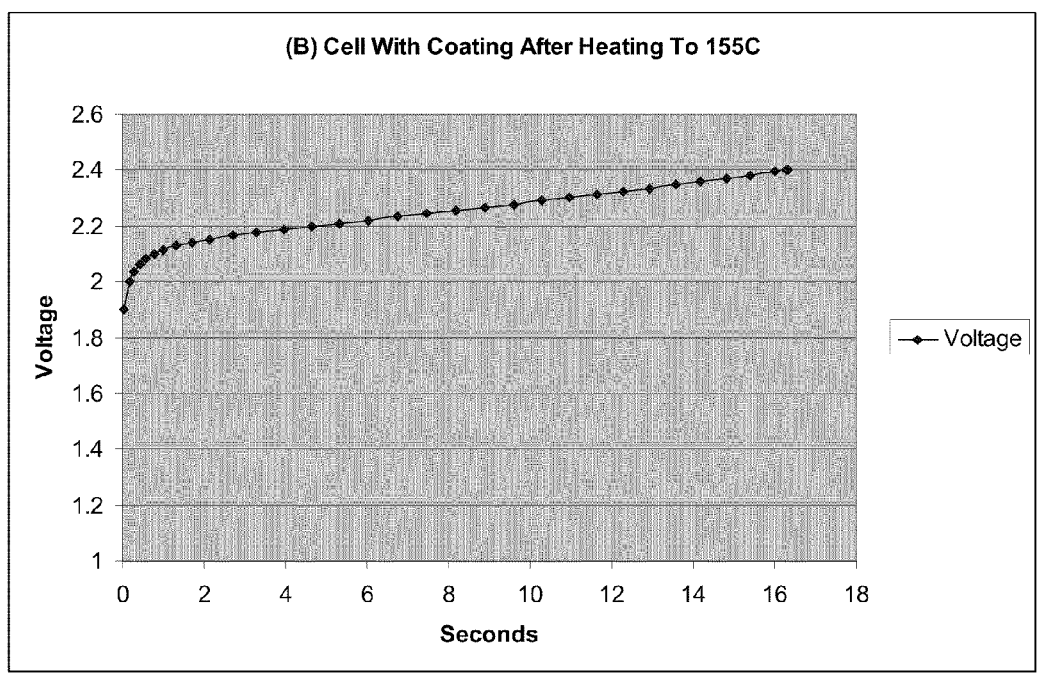

One type used the calcium gluconate monohydrate coating on the LiFePO$_4$ electrode, and the other type used a LiFePO$_4$ electrode without the coating. Both types of CR2032 coin cells used lithium titanium oxide negative electrodes, a high temperature separator that has a shut down temperature over 200° C., and a high temperature electrolyte. These coin cells were cycled at room temperature, and their cycling performance was compared (see FIGS. 1A and 1B). Hence, the calcium gluconate monohydrate does not hinder the cycling performance of the coin cell. Next, the coin cells were heated to 155° C. to activate the intumescent material coated on the cathode and then cooled to room temperature. The coin cells were then cycled. The coin cells without the intumescent coating cycled with low capacity. However, the coin cells with the intumescent coating initially charged within 18 seconds. See FIGS. 2A and 2B. After heating to 155° C., the current capacity (Ahr) of the coin cell with the coating is roughly 159 times less than the current capacity of the coin cell without the coating during their initial charge.

Figure 3:
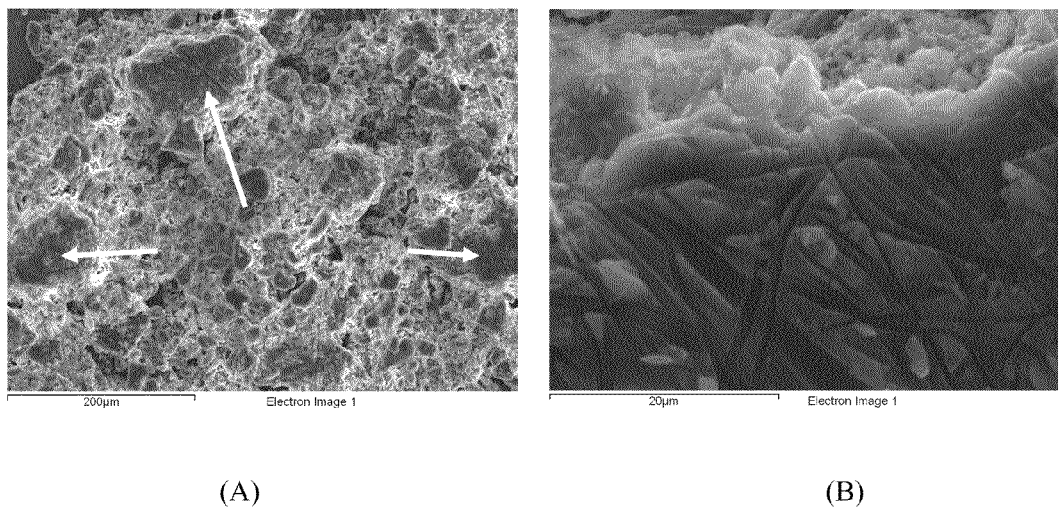
FIGS. 3A and 3B are SEM images of the electrode surface with the calcium gluconate monohydrate coating after being heated to 155C, according to various embodiments.
Figure 4:
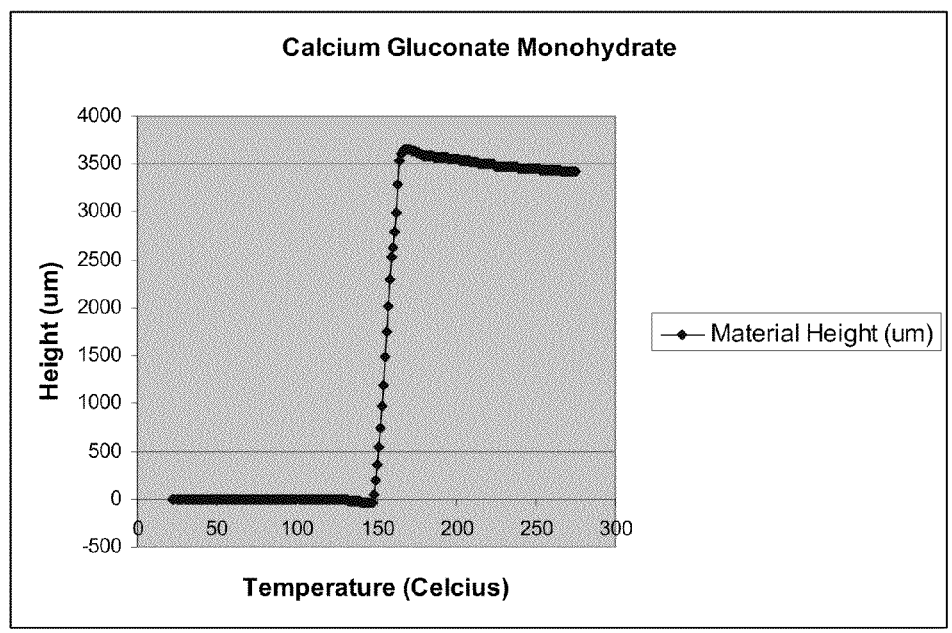
FIG. 4 is a graph illustrating data from a dilatometer of calcium gluconate monohydrate while being heated. The Y axis is the height of the material in micrometers, and the X axis is the temperature.
Figure 5:
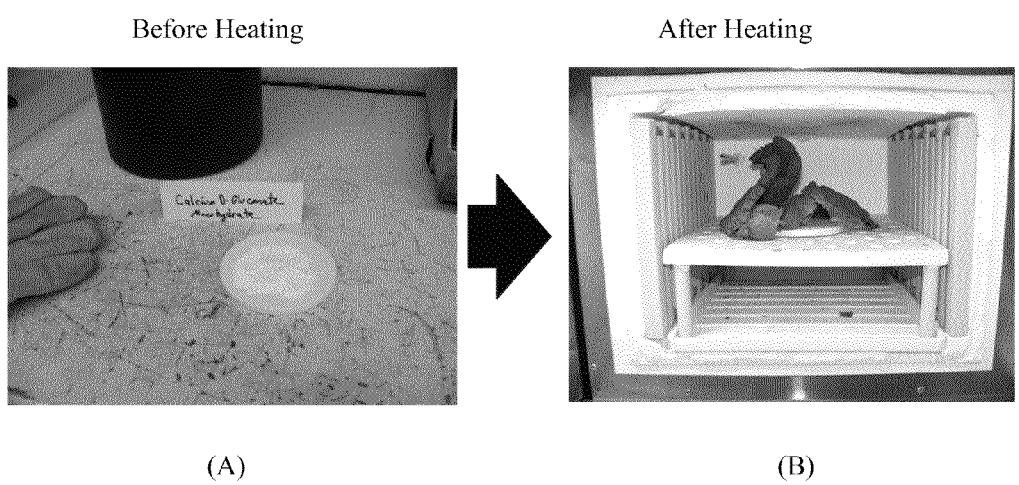
FIGS. 5A and 5B are pictures of calcium gluconate monohydrate before (A) and after (B) heating.

To further investigate the operation of the coating, scanning electron microscope (SEM) images of the coated electrode surface were recorded. See FIGS. 3A and 3B. From these images, it was discovered that the coating formed a tight crystalline reverse mold of the separator. In other words, the coating upon heating expanded and pushed into the separator to form a crystalline structure that impeded the flow of lithium cations through the separator. Without being bound by theory, this explains why the coin cells with the intumescent material coating after heating had a cell shutdown. To further illustrate the response of the calcium gluconate monohydrate cells to heating, dilatometer measurements and photographs were taken. FIG. 4 shows data for calcium gluconate monohydrate taken using a dilatometer. From FIG. 4 it is clear that calcium gluconate monohydrate increases in volume dramatically at about 147° C. The photographs from FIGS. 5A and 5B also illustrate the dramatic, volumetric expansion of the calcium gluconate monohydrate. In summary, the battery, when coated with calcium gluconate monohydrate on the surface of electrode, is able to shut down the cell and prevent thermal run-away events from progressing.

Example 2

Differential scanning calorimetry (DSC). The heat-suppressing properties of the intumescent materials may be described, in part, by comparing the heat evolved from a charged Li$_{0.95}$Ni$_{0.8}$Co$_{0.2}$O$_2$ electrode when heating the electrode in an organic-based electrolyte of a lithium cell: a) in the absence of an intumescent material (control reactions) and b) in the presence of an intumescent, such as calcium gluconate. Solubility tests of calcium gluconate in organic solvents, such as propylene carbonate and dimethyl carbonate and in a conventional electrolyte consisting of 1.0 M LiPF$_6$ in ethylene carbonate:dimethyl carbonate (50:50 mixture by volume) that were conducted prior to performing differential scanning calorimetry tests, showed no apparent solubility of the calcium gluconate, even after several weeks in contact with the solvents and the electrolyte.

Figure 6:
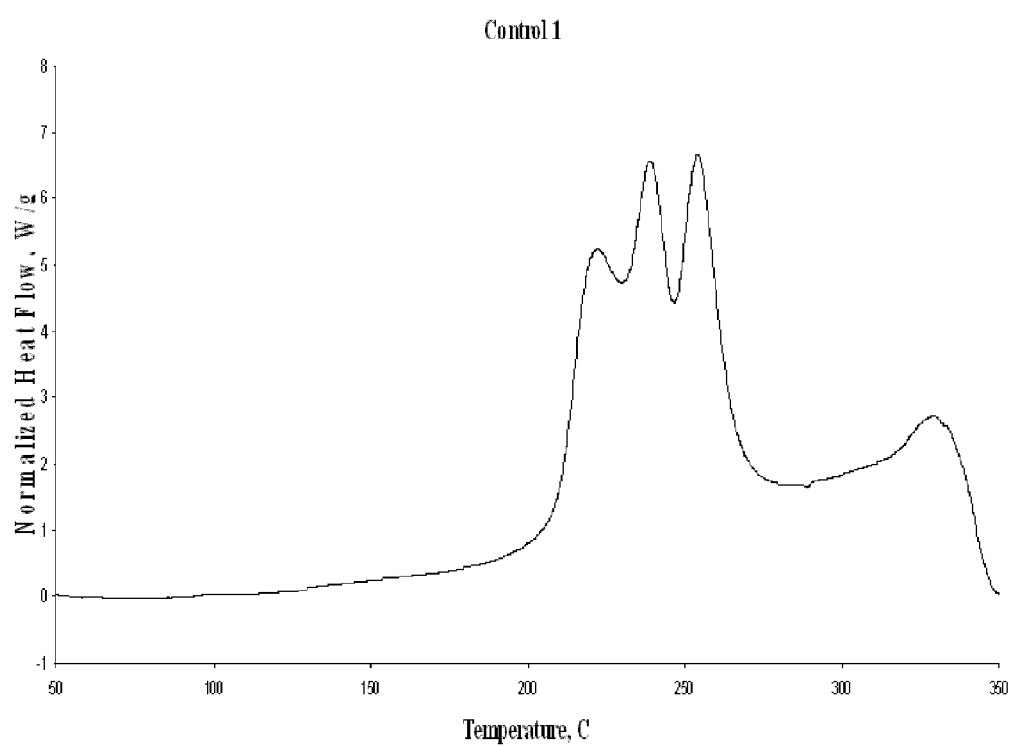
FIG. 6 is a differential scanning calorimetry (DSC) graph for Control 1 in Example 2.
Figure 7:
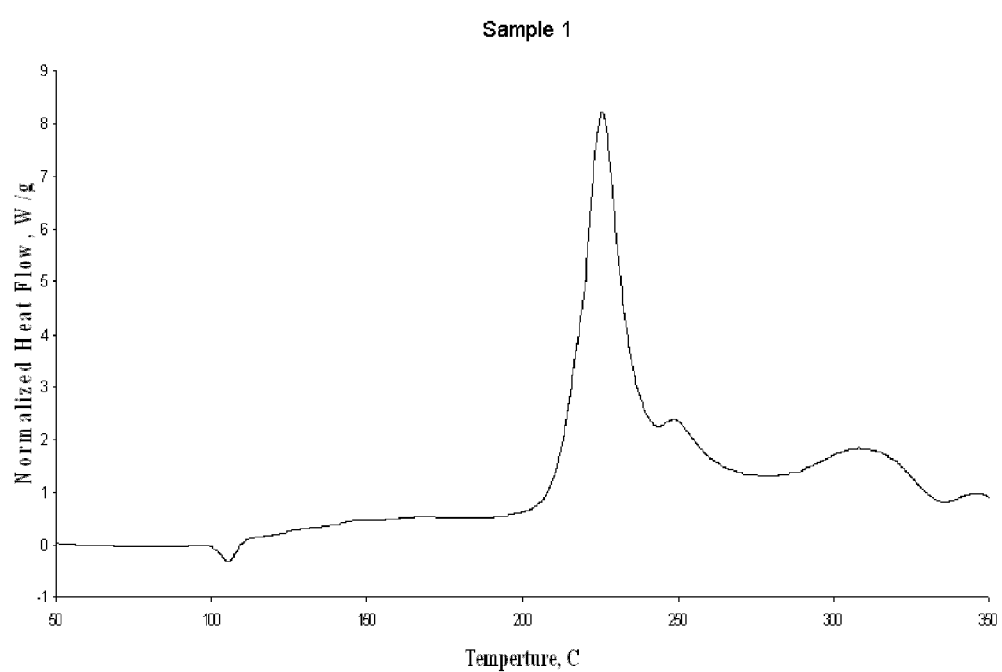
FIG. 7 is a differential scanning calorimetry (DSC) graph for Sample 1 in Example 2.
Figure 8:
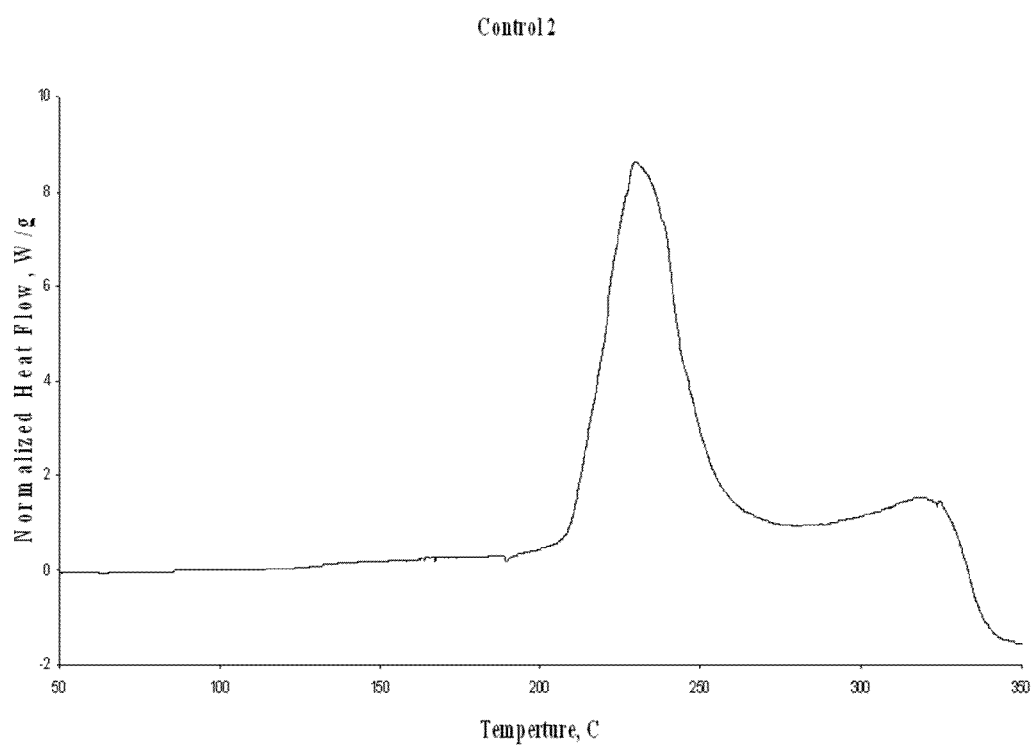
FIG. 8 is a differential scanning calorimetry (DSC) graph for Control 2 in Example 2.
Figure 9:
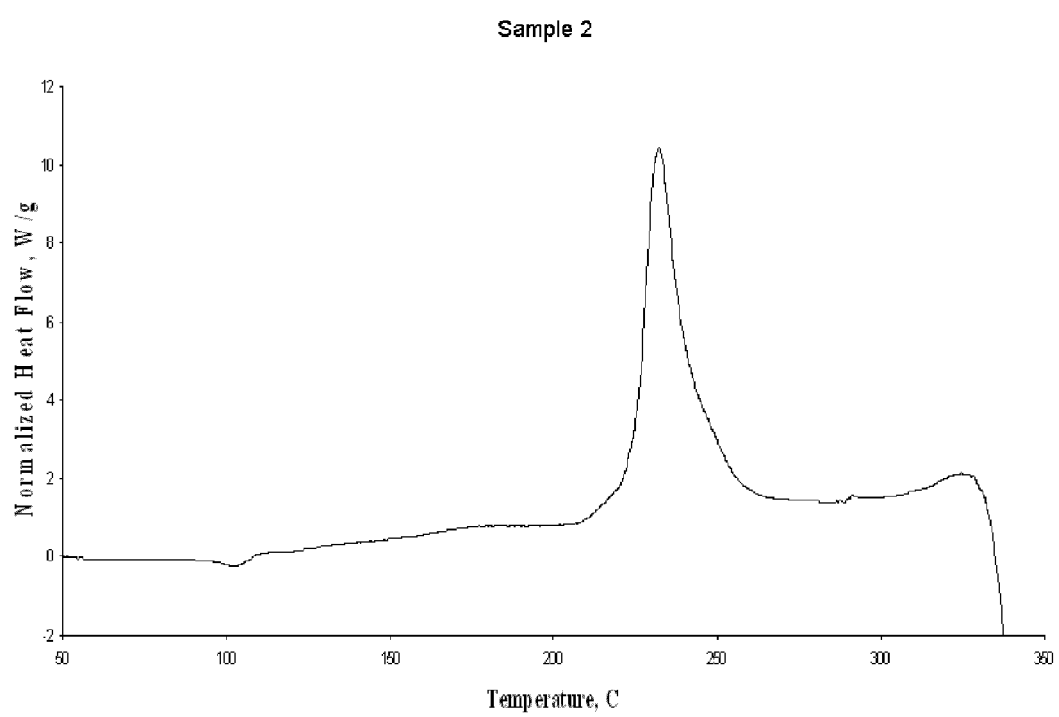
FIG. 9 is a differential scanning calorimetry (DSC) graph for Sample 2 in Example 2.

DSC experiments were conducted using Li$_{1-x}$Ni$_{0.8}$Co$_{0.2}$O$_2$ electrodes that had been extracted from two Li/LiNi$_{0.8}$Co$_{0.2}$O$_2$ cells in an inert atmosphere glovebox after the cells had been charged from 2.8 to 4.2 V at 0.32 mA, and held at open circuit for 15 h. The electrodes contained 84% (by weight) active mass, 8% polyvinylidene difluoride binder (PVDF) and 8% carbon (SFG-6/acetylene black (1:1)) to assist in current collection. Different electrolytes were used in the two cells. In cell 1, the electrolyte was 1.0 M LiPF$_6$, ethylene carbonate(EC):diethyl carbonate (DEC) (1:1). In cell 2, the electrolyte was 1.2 M LiPF$_6$, ethylene carbonate (EC):propylene carbonate(PC):ethylmethyl carbonate (EMC) (3:3:4). DSC tests were performed on samples of the charged electrodes from each of the cells (controls). Tests were also performed on samples of the charged electrodes after thoroughly mixing the electrodes with 12% by weight of calcium gluconate monohydrate. DSC experiments were run at 10° C./min from room temperature to 350° C. The control and sample experiments were labeled as follows:

Control 1: Li$_{0.5}$Ni$_{0.8}$Co$_{0.2}$O$_2$/1.0 M LiPF$_6$, EC:DEC;
Control 2: Li$_{0.5}$Ni$_{0.8}$Co$_{0.2}$O$_2$/1.0 M LiPF$_6$, EC:PC:EMC;
Sample 2-1: Li$_{0.5}$Ni$_{0.8}$Co$_{0.2}$O$_2$, Calcium gluconate/1.0 M LiPF$_6$, EC:DEC;
Sample 2-2: Li$_{0.5}$Ni$_{0.8}$Co$_{0.2}$O$_2$, Calcium gluconate/1.0 M LiPF$_6$, EC:PC:EMC;

The DSC data of Control 1 and Sample 2-1 are shown in FIGS. 6 and 7, respectively. For Control 1, the heat generated between room temperature and 350° C., as determined by integrating the area under the peaks was −1346.4 J/g. By contrast, the presence of calcium gluconate (Sample 2-1, FIG. 7) significantly reduces the area under the peaks and the amount of evolved heat (−841.8 J/g). This result represents a 37.5% reduction in the heat generated by Control 1, which clearly demonstrates the utility of the heat suppressants. When normalized for the amount of active electrode mass in the samples, the reduction of heat is calculated to be 29%. These results are confirmed by the DSC data of Control 2 and Sample 2-2, which are shown in FIGS. 8 and 9, respectively. In these experiments, the heat generated by Sample 2-2 (−911.3 J/g) is 32.8% less than it is for Control 2 (−1357.0 J/g); when normalized for the amount of active mass in the samples, this translates to a 23.7% reduction in evolved heat.

Example 3

Figure 10:
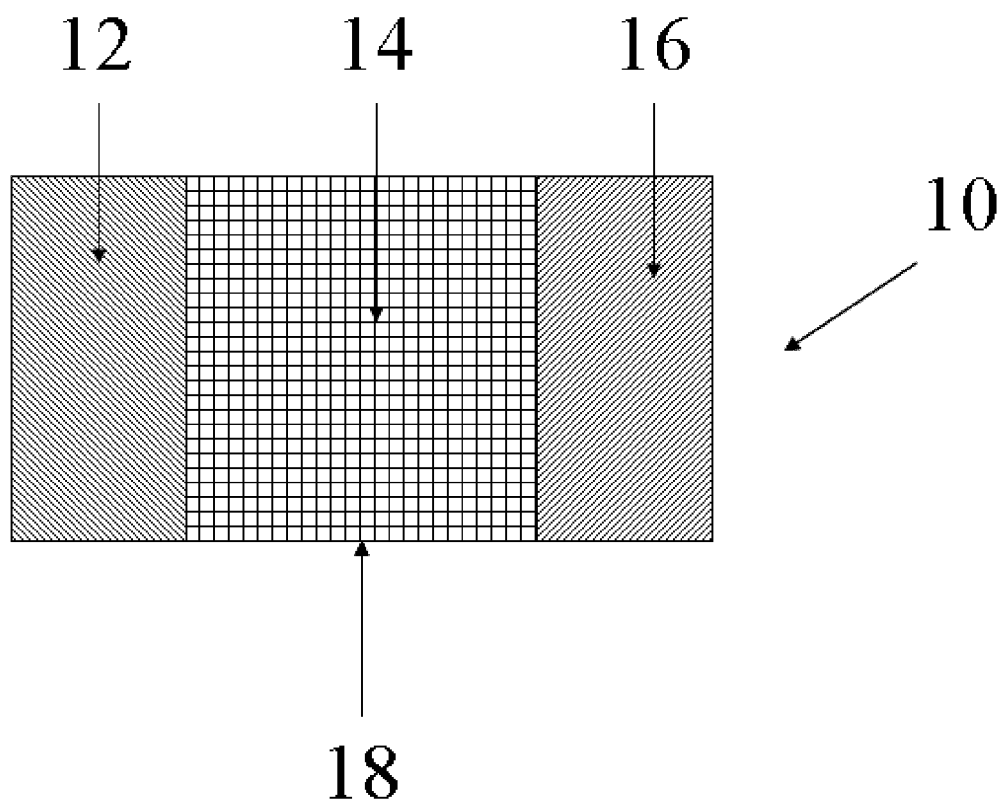
FIG. 10 is a schematic drawing of a typical cell in a battery or supercapacitor, according to various embodiments.
Figure 11:
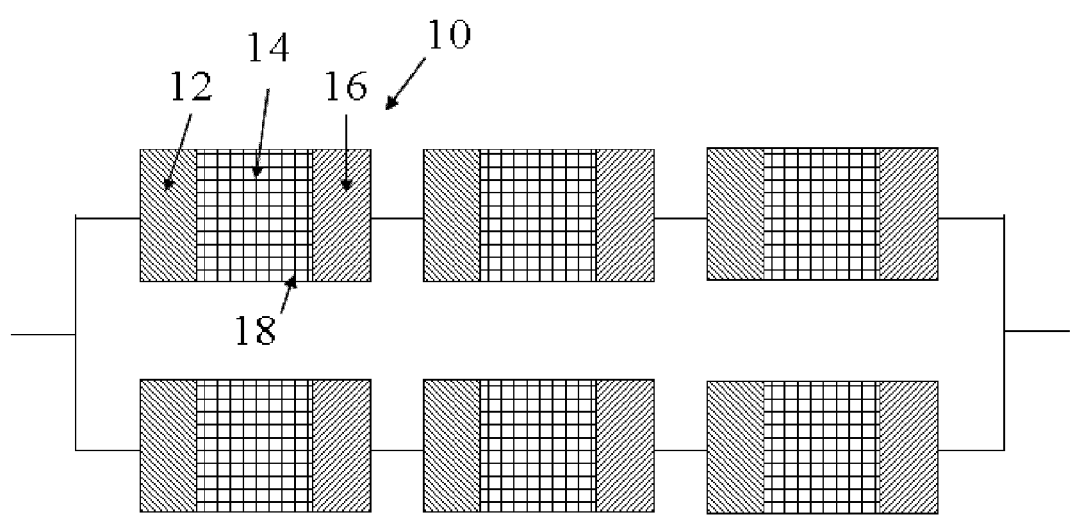
FIG. 11 is a schematic drawing of two strings of electrochemical cells arranged in parallel, with each string having three cells arranged in series, according to various embodiments.

A typical cell of a battery or supercapacitor is illustrated schematically in FIG. 10. The battery 10 has a negative electrode 12 separated from a positive electrode 16 by an electrolyte 14, all components are contained within a suitable housing with terminals (not shown) in electronic contact with the negative electrode 12 and the positive electrode 16. Binders, current collectors, and other materials normally associated with both the electrolyte and the negative and positive electrodes are well known in the art and are not fully described herein, but are included as is understood by those of ordinary skill in this art. FIG. 11 shows a schematic illustration of one example of an electrochemical device in which two strings of electrochemical cells, described above, are arranged in parallel, each string comprising three cells arranged in series. In such embodiments where the cells are arranged in parallel, the activation of the intumescent material to shut down or impede electron flow in one cell will not affect the performance of other cells. Therefore, a parallel arrangement will potentially allow devices to continue to operate, even if one or more cells succumb to thermal run-away, thereby activating the intumescent material and shutting, or severely limiting the electron flow of the cell.

The use of the terms "a" and "an" and "the" and similar referents in the context of describing the elements (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. An electrochemical device comprising:
   a positive electrode;
   a negative electrode;
   a separator;
   a casing; and
   an effective amount of a thermally-triggered intumescent material or a gas-triggered intumescent material;
   wherein:
      the intumescent material is coated on the surface of the positive electrode, on the surface of the negative electrode, or on the surface of the separator as an intumescent material coating; and
      the effective amount is an amount sufficient to impede electron flow and prevent or abate a run-away thermal event.

2. The electrochemical device of claim 1, wherein the intumescent material is coated on the separator.

3. The electrochemical device of claim 1, wherein the intumescent material is coated on the positive electrode.

4. The electrochemical device of claim 1, wherein the intumescent material is coated on the negative electrode.

5. The electrochemical device of claim 1, wherein the intumescent material is calcium gluconate; magnesium gluconate; a material having a glass transition temperature below 250° C. and a blowing agent with activation temperature between 50° C. and 250° C.; a shape memory polymer; or an Expancel® microsphere.

6. The electrochemical device of claim 1, wherein the intumescent material coating further comprises a tetrahydrofuran-based-16-crown-4 compound.

7. The electrochemical device of claim 1, wherein the intumescent material coating further comprises a lithium ionophore.

8. The electrochemical device of claim 7, wherein the lithium ionophore is lithium ionophore I, lithium ionophore II, lithium ionophore III, lithium ionophore IV, lithium ionophore VI; lithium ionophore VII; or lithium ionophore VIII.

9. The electrochemical device of claim 1, wherein the intumescent material coating comprises a porous material.

10. The electrochemical device of claim 9, wherein the porous material is a zeolite; a high porosity alumina aerogel; a high porosity silica aerogel; a high porosity silica xerogel; or a high porosity sandstone.

11. The electrochemical device of claim 1, wherein the separator comprises a polymer that is a thermoplastic polymer; an elastomer; or a gel.

12. The electrochemical device of claim 1, wherein the separator comprises a polymer that is polyether ether ketone; thermoplastic polyimide; polybenzimidazole; a high-temperature sulfones; a polyamide-imide; a fluoropolymer; a polyethersulfone; a liquid-crystal polymer; a polyetherimide; a nylon; a polyphenylene sulfide; polyethylene terephthalate; polyvinylidene fluoride; polypropylene; or polyethylene.

13. The electrochemical device of claim 1, wherein the effective amount of the intumescent material is an amount sufficient to disrupt a short circuit in the electrochemical device.

14. The electrochemical device of claim 13, wherein the effective amount is from 0.001 wt % to 40 wt %.

15. The electrochemical device of claim 1 further comprising an electrolyte solvent.

16. The electrochemical device of claim 1 further comprising a heat suppressant material.

17. The electrochemical device of claim 1, wherein the device is a battery or supercapacitor.

18. An electrochemical device comprising an effective amount of a thermally-triggered intumescent material or a gas-triggered intumescent material;
wherein:
the intumescent material comprises a tetrahydrofuran-based-16-crown-4 compound, a lithium ionophore, or a porous material; and
the effective amount is an amount sufficient to impede electron flow and prevent or abate a run-away thermal event.

19. The electrochemical device of claim 18, wherein the intumescent material comprises the lithium ionophore, and the lithium ionophore comprises lithium ionophore I, lithium ionophore II, lithium ionophore III, lithium ionophore IV, lithium ionophore VI, lithium ionophore VI, or lithium ionophore VIII.

20. The electrochemical device of claim 18, wherein the intumescent material comprises the porous material, and the porous material comprises a zeolite; a high porosity alumina aerogel; a high porosity silica aerogel; a high porosity silica xerogel; or a high porosity sandstone.

21. The electrochemical device of claim 18 further comprising a positive electrode; a negative electrode; a separator; and a casing; wherein: the intumescent material is coated on the surface of the positive electrode, on the surface of the negative electrode, or on the surface of the separator as an intumescent material coating.

22. The electrochemical device of claim 21, wherein the intumescent material is coated on the separator.

23. The electrochemical device of claim 21, wherein the intumescent material is coated on the positive electrode.

24. The electrochemical device of claim 21, wherein the intumescent material is coated on the negative electrode.

25. The electrochemical device of claim 21, wherein the separator comprises a polymer that is a thermoplastic polymer; an elastomer; or a gel.

26. The electrochemical device of claim 21, wherein the separator comprises a polymer that is polyether ether ketone; thermoplastic polyimide; polybenzimidazole; a high-temperature sulfones; a polyamide-imide; a fluoropolymer; a polyethersulfone; a liquid-crystal polymer; a polyetherimide; a nylon; a polyphenylene sulfide; polyethylene terephthalate; polyvinylidene fluoride; polypropylene; or polyethylene.

27. The electrochemical device of claim 18, wherein the intumescent material coating comprises the tetrahydrofuran-based-16-crown-4 compound.

28. The electrochemical device of claim 18 further comprising an electrolyte solvent.

29. The electrochemical device of claim 18 further comprising a heat suppressant material.

30. The electrochemical device of claim 18, wherein the device is a battery or supercapacitor.

31. The electrochemical device of claim 18, wherein the effective amount is from 0.001 wt % to 40 wt %.

* * * * *

UNITED STATES PATENT AND TRADEMARK OFFICE
CERTIFICATE OF CORRECTION

| | | |
|---|---|---|
| PATENT NO. | : 8,999,561 B2 | Page 1 of 1 |
| APPLICATION NO. | : 13/104134 | |
| DATED | : April 7, 2015 | |
| INVENTOR(S) | : Daniel R. Vissers et al. | |

It is certified that error appears in the above-identified patent and that said Letters Patent is hereby corrected as shown below:

In the Claims

In Column 15, Claim 19, remove Lines 18 and 19 "lithium ionophore VI, lithium ionophore VI, or lithium ionophore VIII." And replace with --lithium ionophore VI, lithium ionophore VII, or lithium ionophore VIII.--

Signed and Sealed this
Twenty-first Day of July, 2015

Michelle K. Lee
*Director of the United States Patent and Trademark Office*